M. V. B. ETHRIDGE.
DEVICE FOR AUTOMATICALLY MEASURING THE AREA OF
SIDES OF LEATHER.
No. 194,662. Patented Aug. 28, 1877.
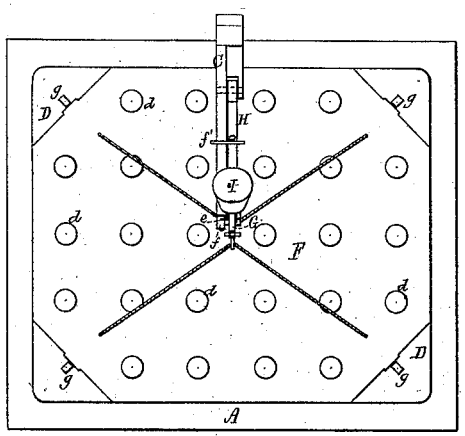
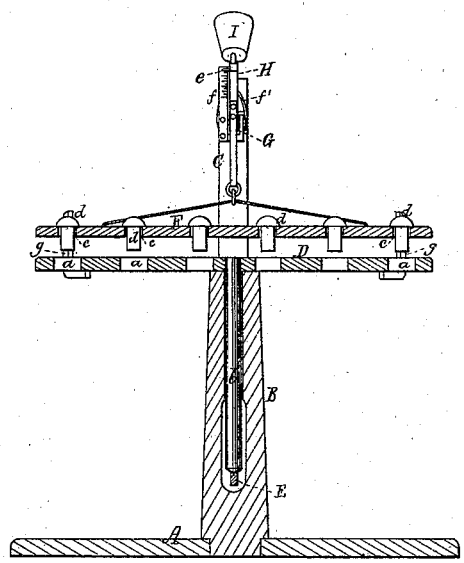
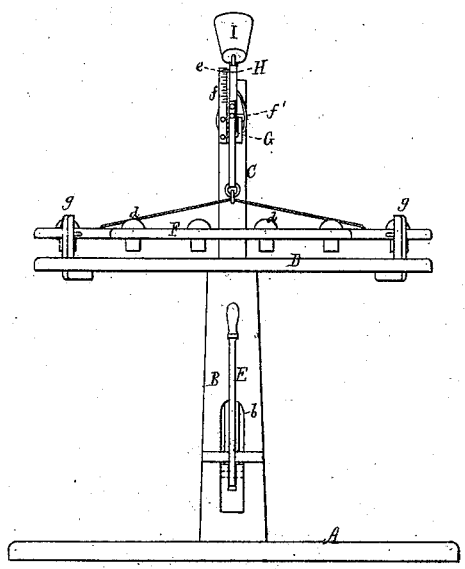
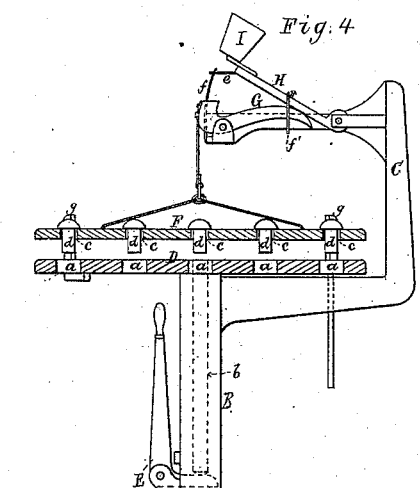
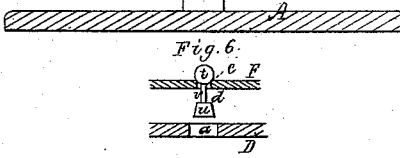
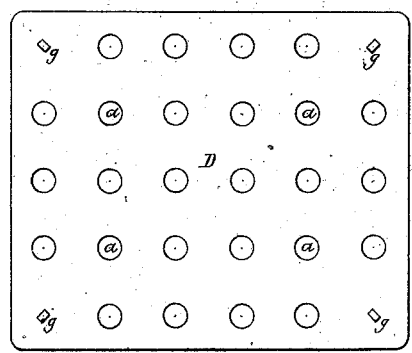
Witnesses.
S. N. Piper
L. W. Miller
Inventor.
M. V. B. Ethridge.
by his attorney.
R. H. Eddy

UNITED STATES PATENT OFFICE.

MARTIN V. B. ETHRIDGE, OF LYNN, ASSIGNOR TO JAMES H. WILLIAMS, OF NEWTON, AND CHARLES W. HOLDEN, OF BOSTON, MASSACHUSETTS.

IMPROVEMENT IN DEVICES FOR AUTOMATICALLY MEASURING THE AREA OF SIDES OF LEATHER.

Specification forming part of Letters Patent No. 194,662, dated August 28, 1877; application filed July 24, 1877.

*To all whom it may concern:*

Be it known that I, MARTIN V. B. ETHRIDGE, of Lynn, in the county of Essex and State of Massachusetts, have invented a new and useful Areameter; and do hereby declare the same to be described in the following specification, and represented in the accompanying drawings, of which—

Figure 1 is a top view, Fig. 2 a front elevation, and Figs. 3 and 4 transverse sections, of it.

The machine is for the purpose of readily determining the area or amount of surface of the side of a hide or skin or other sheet material.

In the drawings, A denotes a base-plate provided at its center with a tubular standard, B, furnished with a goose-neck, C. A bed, D, perforated with a series of holes, a, (see Fig. 5, which is a top view of such bed,) rests on the upper end of the standard, and has a rod, b, extending from it downward within the said standard and to a lever, E, pivoted thereto.

Over the said bed is a corresponding platen, F, which has a series of holes, c, through it, each one of which is directly over one of the holes a. This platen is suspended from the shorter arm of a lever, G, whose longer arm extends underneath and against an index-arm, H. The lever as well as the arm is pivoted to the goose-neck, and there is applied to the index-arm a weight, I, for counterbalancing the platen.

In each hole of said platen is a headed metallic pin, d, all being as represented, the pin being free to move vertically in such hole. There also extends from the index-arm a pointer, e, which is arranged aside of a scale, f, erected on the goose-neck. Vertical posts g, extending up from the bed in manner as shown, serve to guide the platen in its movements and to keep its holes directly over those of the bed.

Each pin is to represent a unit or certain amount of area. If, for example, we suppose the area in which the pins are situated to amount to two thousand five hundred square inches, and we have twenty-five hundred pins in such, arranged at equal distances apart and in parallel lines, both widthwise and lengthwise of the platen, each pin will indicate a square inch as the unit of surface, there being fifty pins in each row. If, also, we suppose the scale to be divided into twenty-five hundred parts, and they to be so arranged that whatever number of the pins may be raised so as not to bear down upon the platen, such number will be indicated by the amount of descent of the pointer on the scale, we shall have the machine complete and ready for use.

To use it, a skin is to be placed on the bed and beneath the pins. This having been done, the bed should be forced upward by the lever E so as to press the skin up against the pins and force upward off the platen all of such pins as may be directly over the skin, the remaining pins, or those outside of the edges of the skin, being left to bear on the platen. In the meantime the index-pointer will descend to the division on the scale that may indicate the number of pins so thrown out of bearing on the platen, which number will correspond to the number of square inches of area in the skin.

By means of such a machine or areameter, it will be seen that it becomes a very easy matter to determine very nearly, if not accurately, the superficial measure of a dressed skin or hide or other piece of sheet material.

A ring, f', encircling the lever G and arm H, serves as a stop to bring the pointer to the head of the scale when there is no sheet or skin on the bed.

The equivalent of the above-described devices for counterbalancing the platen and indicating the weights of the pins would be a common weighing-lever, and its scale-pan, balancing-weight or poise, and index-weight, the divisions of the lever being indicative of the number of pins at any time in action on the platen, which number, subtracted from the whole number of pins, will give the area of the article or skin that may be on the bed.

Instead of each of the headed pins, as described, there may be used a pin suspended from a cord or chain going over a pulley and provided with a weight to represent the unit or square-inch of surface. On forcing up the pin the weight will be let down upon the platen. In this case, however, the number of weights so let down will indicate the number of square inches of surface in operation to raise the pins.

Fig. 6 represents another method of forming each pin $d$, and applying it to the hole in the platen, the pin being provided with a head, $t$, and a foot-weight, $u$, to its shank $v$. In such figure the bed is shown in part at D, and the platen at F, $a$ being the pin-hole of the bed, and $c$ that of the platen. This pin is so constructed in order to prevent it from sticking to or improperly bearing in the platen.

I claim as my invention—

An areameter, substantially as described, consisting of the movable perforated bed and platen, their series of pins, and the supporting-lever, index-arm, platen-counterbalance, and the pointer and scale, all applied, arranged, and supported essentially in the manner as set forth, the bed being provided with a lever or means of forcing it upward, as explained.

MARTIN V. B. ETHRIDGE.

Witnesses:
R. H. EDDY,
JOHN R. SNOW.